United States Patent [19]

Saito

[11] Patent Number: 5,177,513

[45] Date of Patent: Jan. 5, 1993

[54] MOVING PICTURE MANAGING DEVICE AND METHOD OF MANAGING A MOVING PICTURE

[75] Inventor: Akira Saito, Tokyo, Japan

[73] Assignee: Kabushiki Kaisha Toshiba, Kawasaki, Japan

[21] Appl. No.: 850,904

[22] Filed: Mar. 13, 1992

[30] Foreign Application Priority Data

Jul. 19, 1991 [JP] Japan ................................. 3-179627

[51] Int. Cl.⁵ ............................................. G03B 21/00
[52] U.S. Cl. ...................................... 352/129; 352/87
[58] Field of Search ............................ 352/129, 87, 48

[56] References Cited

U.S. PATENT DOCUMENTS

5,083,860 1/1992 Miyataka et al. .................... 352/129

Primary Examiner—Monroe H. Hayes
Attorney, Agent, or Firm—Cushman, Darby & Cushman

[57] ABSTRACT

In a moving picture managing device, representative pictures are selected beforehand from the individual cuts or scenes of a moving picture in which a scene and cuts are arranged in a tree structure, and then are stored in a magnetic disk as decoded high-speed displaying pictures. Upon request of high-speed display, those representative pictures are browsed sequentially and displayed.

14 Claims, 11 Drawing Sheets

FIG. 13 ated in and constitute a part of the specification, illustrate a presently preferred embodiment of the invention, and together with the general description given above and the detailed description of the preferred embodiment given below, serve to explain the principles of the invention.

MOVING PICTURE MANAGING DEVICE AND METHOD OF MANAGING A MOVING PICTURE

BACKGROUND OF THE INVENTION

1. Field of the Invention

This invention relates to a moving picture managing device that manages moving pictures in which a scene and cuts are organized in a tree structure, and more particularly to a moving picture managing device that, upon request of high-speed display, provides a successive browsing display of the representative pictures of the individual cuts and also relates to a method of managing a moving picture.

2. Description of the Related Art

With the recent spread of VTRs and video movies, moving pictures have been one of the most popular media. As more and more moving pictures are recorded to storage media such as videocassettes, it is increasingly difficult to manage them. At present, there is no choice but to inefficiently retrieve stored moving pictures using the label of each cassette.

Since videocassettes are basically sequential access media, to locate a desired scene in a videocassette for retrieval or editing, it is necessary to repeat the fast-forward and the fast-rewind transport while watching the tape counter until the desired portion is reached.

Therefore, it is difficult not only to find out the necessary scenes or cuts, but also to edit tape by scene or cut. On top of that, segmenting a moving picture into cuts poses a heavy burden to the user.

SUMMARY OF THE INVENTION

Accordingly, the object of the present invention is to provide a moving picture managing device capable of managing moving pictures by storing them in a hierarchy structure of scenes and cuts, readily retrieving the necessary scenes or cuts, enabling an easy editing by scene or cut, and allowing an automatic segmentation of a picture by cut, all of which help alleviate the user's loads and also to provide a method of managing a moving picture.

The foregoing object is accomplished by providing a moving picture managing device comprising: input means for inputting information according to a moving picture; sensing means for, based on the difference between the number of blocks in encoding the moving picture within a frame and the number of blocks in an adjacent frame, sensing a boundary between a cut of the input moving picture and another cut, each cut consisting of a plurality of frames; storing means for storing moving picture information corresponding to the moving picture supplied by cut according to the boundary sensed by the sensing means, and the decoded high-speed displaying pictures obtained in such a manner that a particular frame is selected as a representative picture from the frames constituting a cut, each selected frame representing at least each of the cuts; output means connected to the storing means for supplying by cut the moving picture read from the storing means; first specifying means for specifying a partition between a scene and another scene, each scene consisting of a plurality of cuts of the output moving picture from the output means; first processing means for, based on the specification by the first specifying means, causing the storing means to store a moving picture arranged in a tree structure of a plurality of scenes and cuts, each scene being coupled to a plurality of cuts belonging to the lower plane; second specifying means for specifying the browsing and output of the high-speed displaying pictures stored in the storing means; and means for, based on the specification by the second specifying means, causing the output means to perform the output of the high-speed displaying pictures browsed from the storing means.

Also, another object is accomplished by providing a method of managing a moving picture comprising steps of:

inputting information according to a moving picture which has a format formed by a plurality of blocks;

based on the difference between the number of blocks in encoding the moving picture within a frame and the number of blocks in an adjacent frame, sensing a boundary between a cut of the input moving picture and another cut, each cut consisting of a plurality of frames;

storing encoded moving picture information corresponding to said moving picture supplied in units of one cut according to the boundaries sensed at said sensing step, and the decoded high-speed displaying pictures obtained in such a manner that a particular frame is selected as a representative picture from the frames constituting a cut, each selected frame representing at least each of said cuts in a storing means;

outputting in units of one cut the decoded moving picture read by said storing step;

first specifying a partition between a scene and another scene, each scene consisting of a plurality of cuts of the output moving picture;

based on the specification by said first specifying step, storing a moving picture arranged in a tree structure of a plurality of scenes and cuts, each scene being coupled to a plurality of cuts belonging to the lower plane;

second specifying the browsing and output of said high-speed displaying pictures stored in said storing means; and based on the specification by said second specifying step, performing the output of the high-speed displaying pictures browsed from said storing means.

a moving picture managing device and a method of managing a moving picture according to the present invention make it possible to manage moving pictures by storing them in a hierarchy structure of scenes and cuts, easily retrieve the necessary scenes and cuts, allow an easy editing by scene or cut, and even provide an automatic segmentation of a picture into cuts, all of which help alleviate the user's loads.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
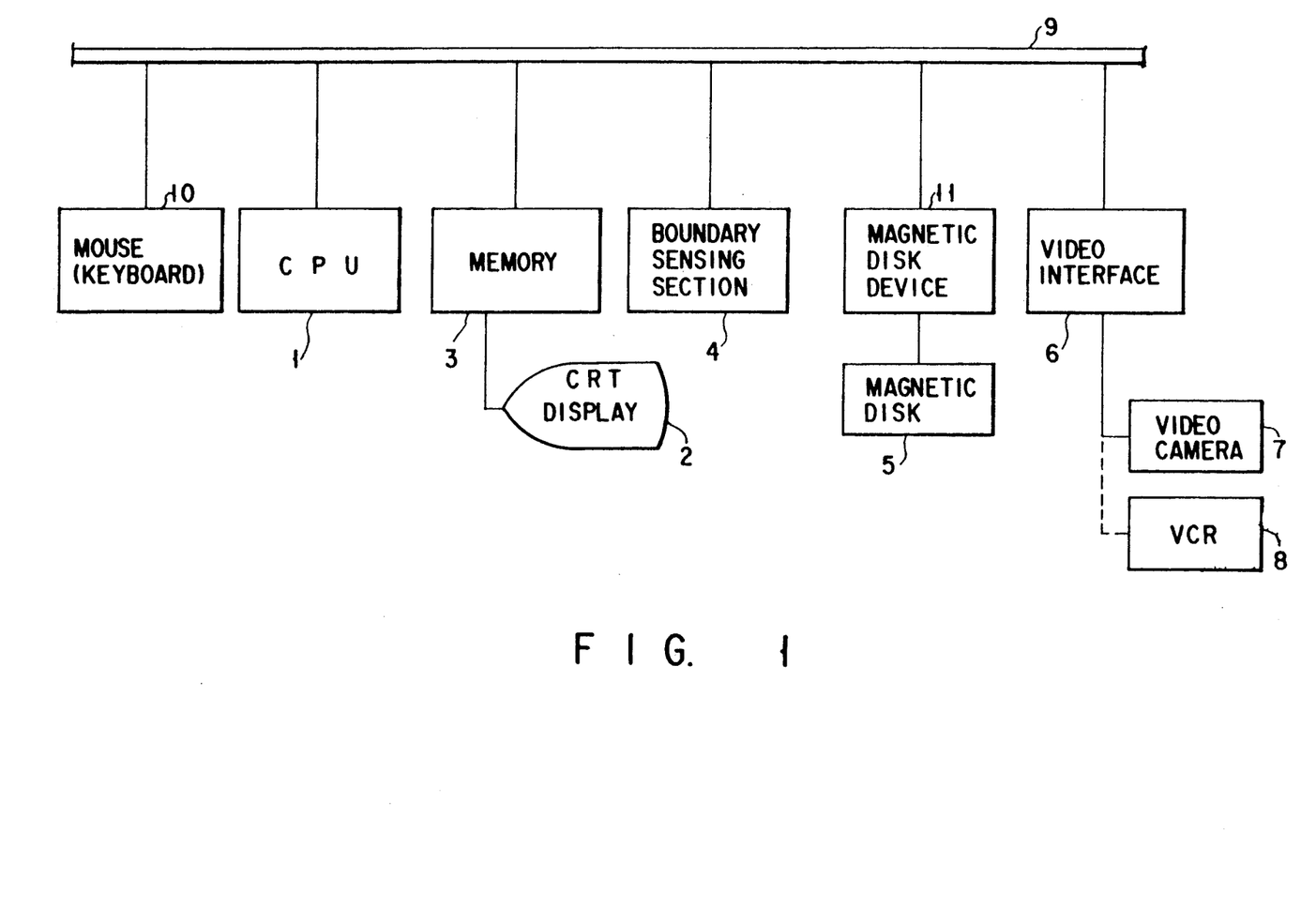
FIG. 1 is a schematic block diagram showing an overall construction of a moving picture managing device according to the present invention.

An embodiment of the present invention will be described in detail, referring to the accompanying drawings. FIG. 1 is a block diagram for a moving picture managing device according to the present invention. The moving picture managing device is composed of: a CPU 1 for performing various controls; a CRT display device 2 for displaying moving pictures and information on moving picture management; a memory 3 for storing the control program for the CPU 1, pictures to be displayed on the CRT display device 2, and others; a boundary sensing section 4 for receiving a series of moving pictures made up of a plurality of cuts and sensing cut boundaries; a magnetic disk device 11 for handling a magnetic disk (HD) 5 that stores a series of moving pictures or single-cut files consisting of a plurality of frames segmented at the boundary sensing section 4; a video interface 6 for receiving an NTSC (National Television System Committee) signal from a video camera 7, VCR 8, or the like and converting it into a format suitable for the present moving picture managing device; the video camera 7 or VCR 8 connected to the video interface 6; and a mouse (or a keyboard) serving as input means.

Connected to a bus 9 are the CPU 1, memory 3, boundary sensing section 4, video interface 6, mouse 10, and magnetic disk device 11, of which the CPU 1 controls the other components.

In place of the magnetic disk 5, other types of storage medium may be used. For example, an optical disk (OD) or a remote file by way of a network may be used.

Figure 2:
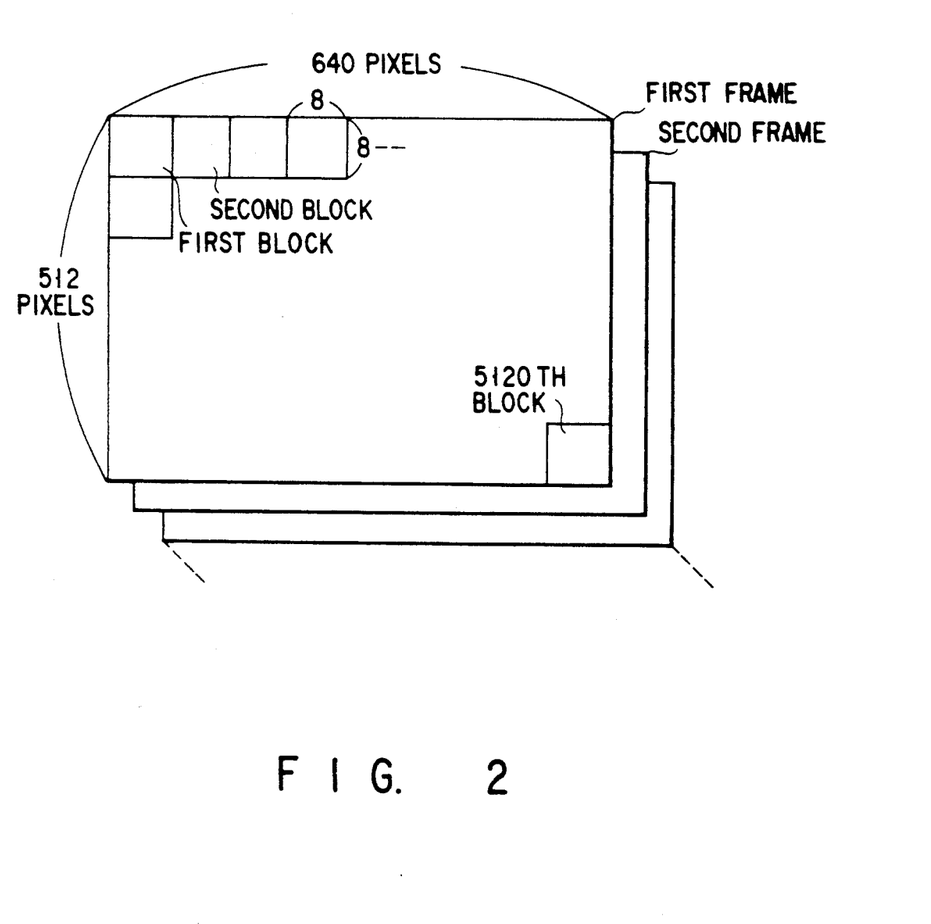
FIG. 2 shows a format of moving pictures designed to be processed by a moving picture managing device according to the present invention.

An example of a format of moving pictures used in the embodiment is shown in FIG. 2. A pixel is represented by density of 8 bits and chromaticity (I, Q) of 4 bits each and 640×512 pixels constitute a frame and 30 frames are processed in a second. The boundary sensing section 4 carries out operation in blocks that are obtained by dividing 640×512 pixels into blocks of 8×8 pixels.

Figure 3:
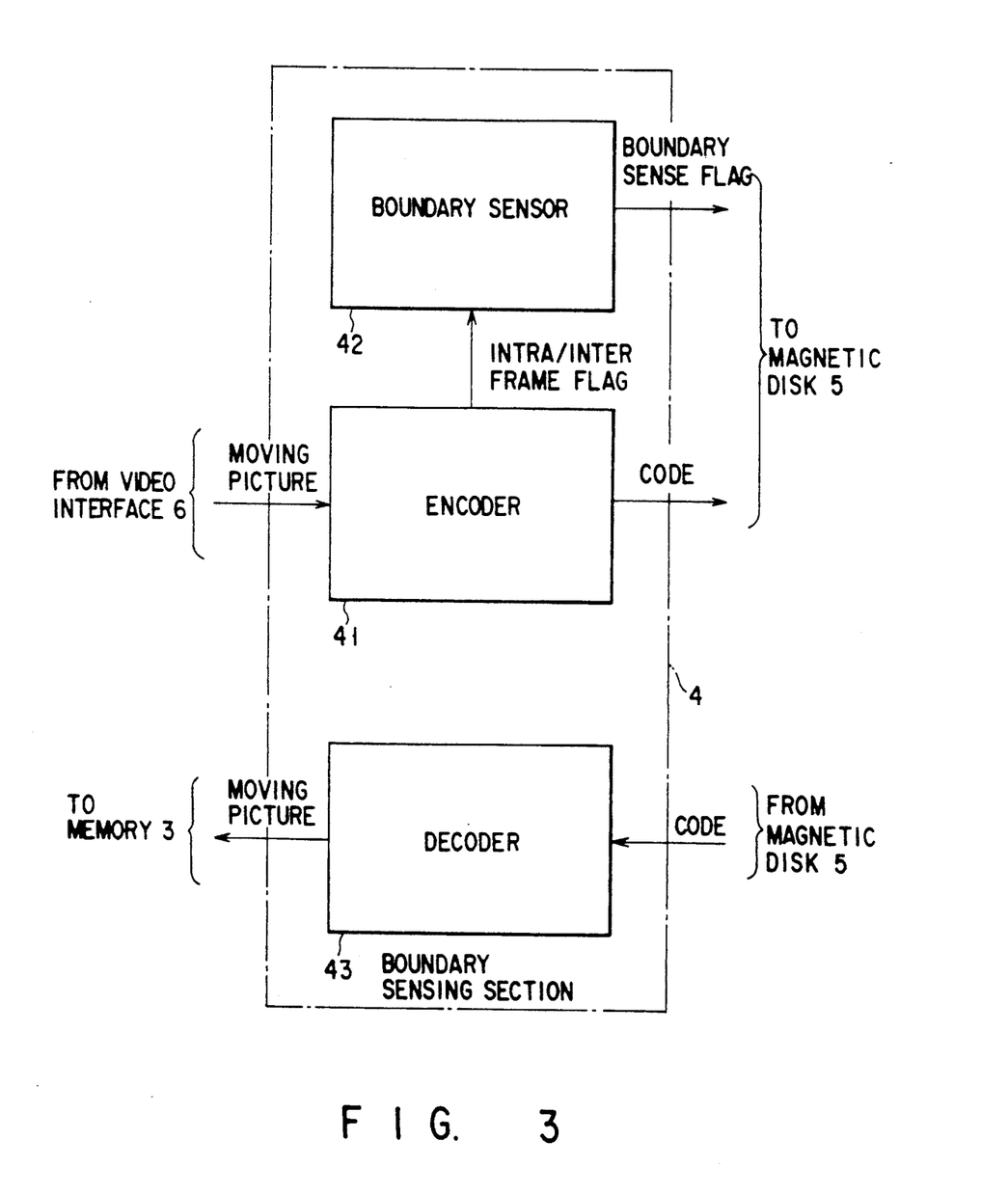
FIG. 3 is a block diagram for the cut boundary sensing section of FIG. 1.

The boundary sensing section 4, as shown in FIG. 3, is composed of: an encoder 41 for encoding the input picture through the interframe comparison of sensing the presence or absence of movements by comparing a frame with the previous frame in blocks or the interframe comparison of sensing the presence or absence of movements by comparing the adjacent frames in terms of the number of blocks encoded, which causes smaller errors; a boundary sensor 42 for sensing the cut boundaries of consecutive frames by using the intraframe flag/interframe flag supplied from the encoder 41; and a decoder 43 for decoding the encoded moving pictures.

Moving picture information encoded at the encoder 41 is segmented into cuts at the boundaries sensed by the boundary sensor 42, and these cuts, with a cut as a file, are stored in the magnetic disk 5.

The decoder 43 decodes a file stored in the magnetic disk 5 when it is displayed.

Figure 4:
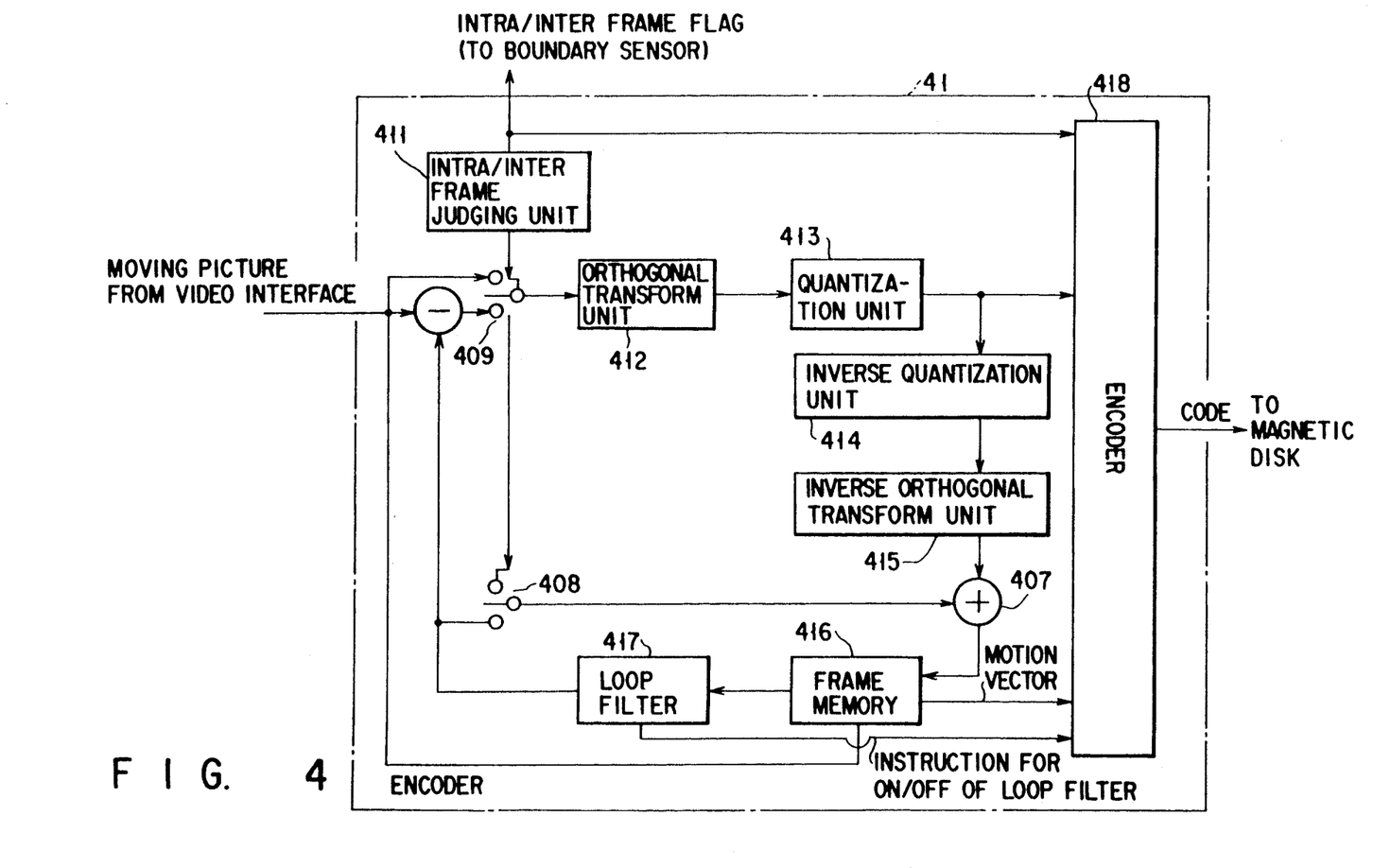
FIG. 4 is a block diagram for the encoder of FIG. 3.

The encoder 41, as shown in FIG. 4, is made up of an intraframe/interframe judging unit 411, an orthogonal transform unit 412, a quantization unit 413, an inverse quantization unit 414, an inverse orthogonal transform unit 415, a frame memory 416, a loop filter 417, an encoder 418, a subtracter 410, selector switches 408 and 409, and an adder 407.

The intraframe/interframe judging unit 411 predicts for a frame the amount of change in the moving picture motion between the input block and the block undergone motion compensation using a retrieved moving vector and when the prediction error is large, continues the prediction between the input block and the block already present in the frame. When the prediction error is large, then the selector switches 409 and 408 will be switched to the upper position to deliver the picture of the input block a it is to the orthogonal transform unit 412 via the selector switch 409. When the prediction error is small, then the selector switches 409 and 408 will be changed to the lower position, so that the block or blocks of the immediately preceding picture from the loop filter 417 is or are subtracted from the input block of a moving picture at the subtracter 410 and then the resulting picture is supplied to the orthogonal transform unit 412.

The orthogonal transform unit 412 performs a two-dimensional orthogonal transform (DCT) on the picture supplied from the selector switch 409. The quantization unit 413 quantizes the result of orthogonal transform at the orthogonal transform unit 412. The inverse quantization unit 414 carries out the inverse quantization in order to perform the motion compensation of the coefficient of 8×8 pixels after quantization by the quantization unit 413. The inverse orthogonal transform unit 415 decodes the data from the inverse quantization unit 414 by inverse orthogonal transform. The frame memory 416 stores the added picture (the immediately preceding picture) from the adder 407, the picture being obtained by adding the decoded data from the inverse orthogonal transform unit 415 to the picture supplied via the loop filter 417 and selector switch 408 from the frame memory 416 at the adder 407.

The loop filter 417 is used to reduce quantization errors. The encoder 418 supplies codes according to the block specification by the intraframe/interframe judging unit 411, the quantization index for conversion coefficient and the instruction from the quantization unit 413, the motion vector from the frame memory 416, and the loop on/off instruction from the loop filter 417.

With this configuration, the intraframe/interframe judging unit 411 predicts for a frame the amount of change in the moving picture motion between the input block and the intraframe block undergone motion compensation using a retrieved motion vector. When the prediction error is large, the selector switches 409 and 408 will be switched to the upper position, whereas when it is small, they will be switched to the lower position. Therefore, with a large prediction error, the picture of the input block is supplied as it is via the selector switch 409 to the orthogonal transform unit 412, which performs a two-dimensional orthogonal transform (DCT). Then, the orthogonally transformed data is quantized at the quantization unit 413 and is supplied to the encoder 418.

The quantized data from the quantization unit 413 is decoded at the inverse quantization unit 414 and inverse orthogonal transform unit 415 and then is supplied to the adder 407. The adder 407 adds the decoded picture from the inverse orthogonal transform unit 415 to the immediately preceding picture from the frame memory 416 and the resulting picture updates the contents of the frame memory 416. The encoder 418 supplies codes according to the specification of blocks in the intraframe/interframe by the intraframe/interframe judging unit 411, the quantization index for conversion coefficient and the instruction from the quantization unit 413, the motion vector from the frame memory 416, and the loop filter on/off instruction from the loop filter 417.

The way of dividing a moving picture composed of a series of frames into cuts will now be explained.

Since there is a great similarity between continuous frames within a cut, interframe encoding has smaller prediction errors, requiring the decreased number of blocks to undergo interframe encoding. Conversely, a correlation between the last frame of a cut and the first frame of the next cut is much less strong, so that intraframe encoding is more preferable, which locally increases the number of blocks undergone intraframe encoding. In this way, a series of moving pictures is segmented into individual cuts.

Figure 5:
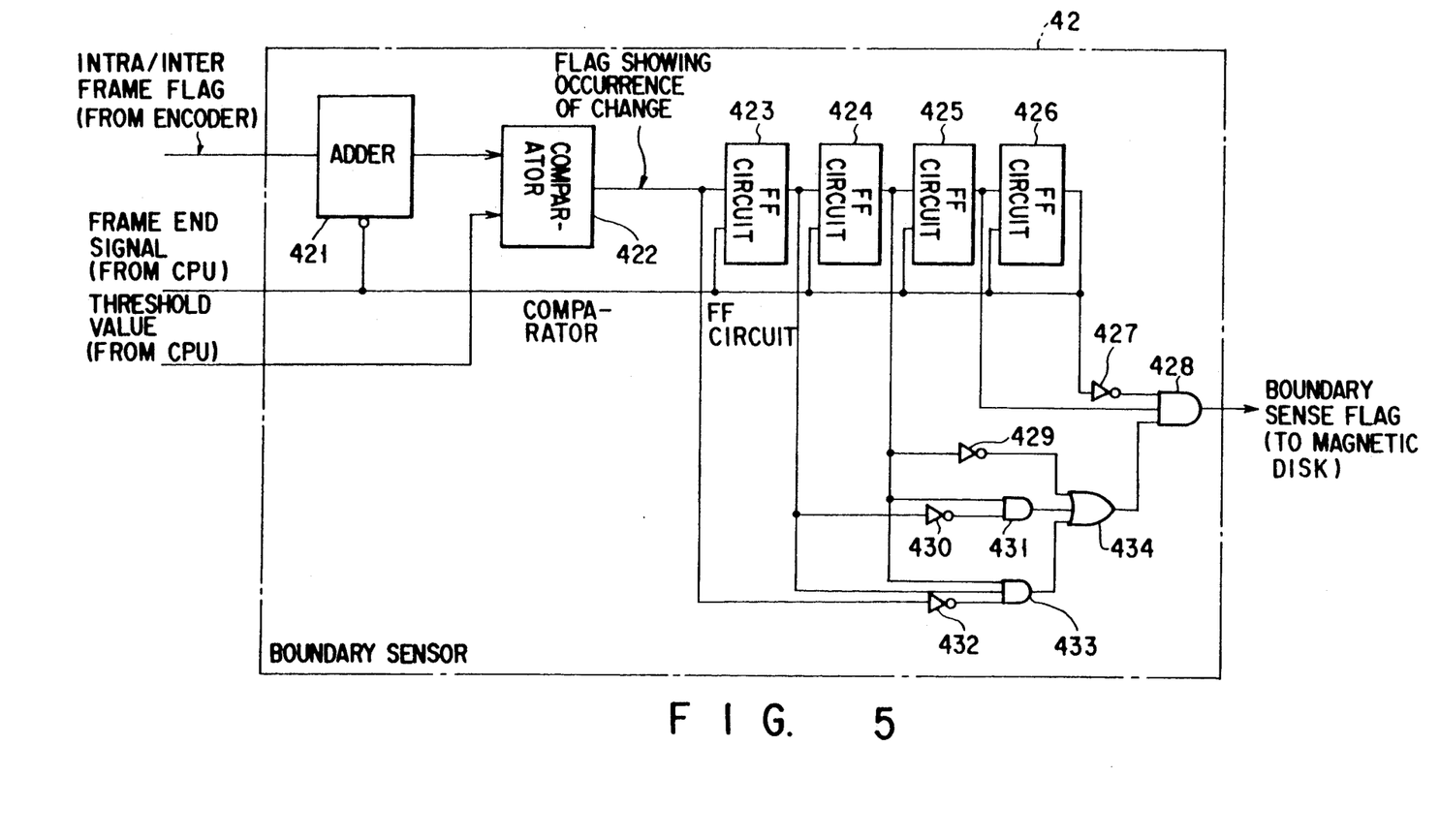
FIG. 5 is a block diagram for the boundary sensor of FIG. 3.

The boundary sensor 42, as shown in FIG. 5 is made up of an adder 421, a comparator 422, FF circuits 423 through 426, and logic gates 427 through 434. The adder 421, which is initialized to zero by the frame end signal (or the frame start signal) from the CPU 1, checks each block to see if the flag from the encoder 41 is that of intraframe or interframe, and increase, by 1 when it is an intraframe flag, while remaining unchanged when it is an interframe flag. The comparator 422 compares the number of blocks encoded for a frame with the threshold value previously given by the CPU 1 and when the number of blocks is larger, supplies a flag indicating that there was a change (or a presence-of-change flag).

The FF circuits 423 through 426, which constitute a four-stage circuit and latch the presence-of-change flag from the comparator 422 with the timing of the frame end signal from the CPU 1, hold information on the presence or absence of changes in the last four frames. The logic gates 427 through 434 made up a logic circuit that determines that a cut boundary is sensed when the flags indicating the presence or absence of changes in five consecutive frames are in the order of <absence, presence, absence, *, * (* may be either presence or absence)> or <absence, presence, presence, absence, *> or <absence, presence, presence, presence, absence>.

With this arrangement, the adder 421 is initialized to zero for each frame with the timing of the frame end signal from the CPU 1. When the flag sent from the encoder 41 for each block is that of an intraframe block, the adder 421 increases by 1 and supplies the result to the comparator 422. When the comparator 422 determines that the contents of addition from the adder 421, or the number of blocks encoded for a frame, is larger than the specified threshold value, it supplies a presence-of-change flag to the FF circuit 423.

The FF circuits 423 through 426, with the timing of the frame end signal form the CPU 1, latch the presence-of-change flag in sequence to hold information on the presence or absence of changes in the last four frames. When the contents of the latched data in the FF circuits 423 through 426 are one of <absence, presence, absence, * *>, <absence, presence, presence, absence, *>, and <absence, presence, presence, presence, absence>, logical operation by the logic gates 427 through 434 determines that a cut boundary has been sensed and the logic gate 428 produces a boundary flag.

That is, this logic circuit determines the existence of a cut boundary when a presence of change continuous over three consecutive three frames or less with the preceding and the following absence.

Figure 6:
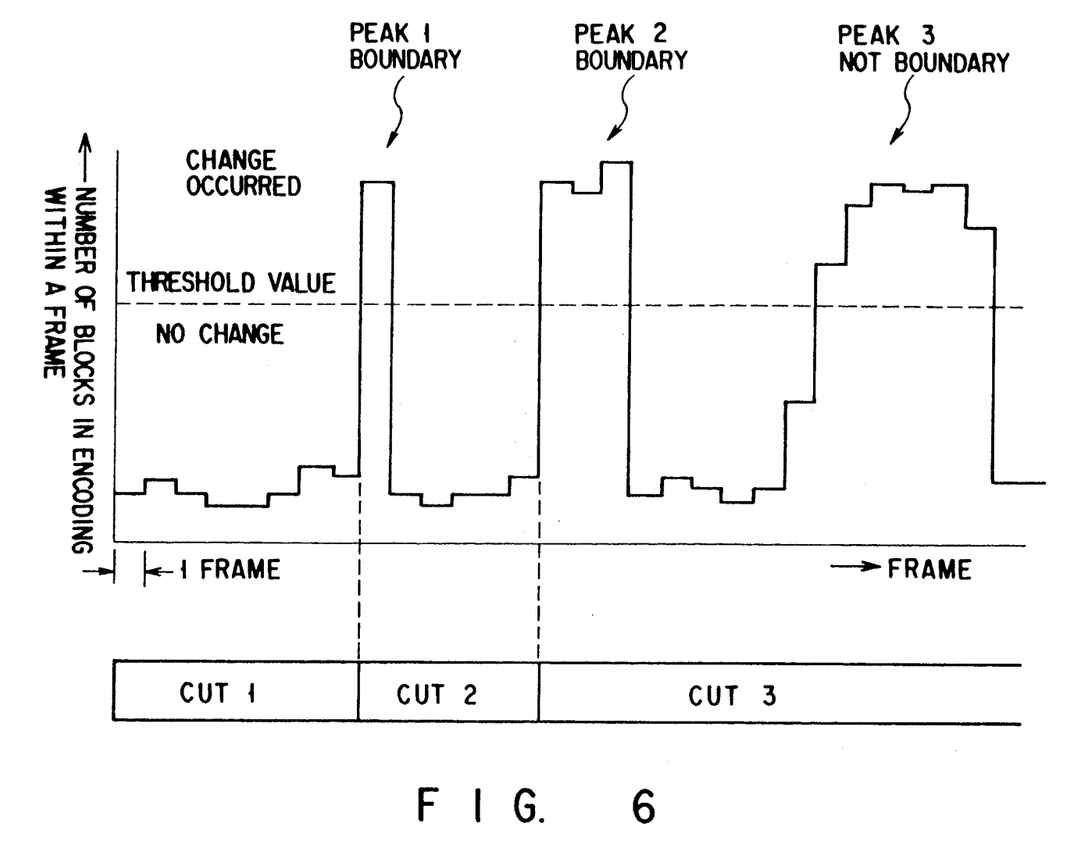
FIG. 6 is an explanatory diagram for the operation of the boundary sensor of FIG. 5.

An example of judgment is shown in FIG. 6. The number of frames are indicated on the abscissa axis and the number of blocks encoded for each frame on the ordinate axis. It is assumed that the number of blocks encoded has changed as shown in the figure. Because peak 1 has a portion higher than the threshold value for only one frame with the preceding and following frames remaining unchanged, the boundary sensor 42 of FIG. 5 judges that a boundary is sensed. As a result, the first frame to the frame immediately before peak 1 are segmented as cut 1 and stored as a file. Similarly, peak 2 is also judged for a boundary, so that the frames from peak 1 to just before peak 2 are segmented as cut 2. On the other hand, peak 3 has more than three consecutive frames with the presence of change, so that it is not judged to be a boundary.

In this way, an object moving in front of the lens of the video camera 7 or a sudden, large movement of the video camera is not erroneously judged to be a cut boundary, which provides good segmentation.

In the embodiment, a portion where an absence of change lasts for one or more frames, a presence of change for three or less consecutive frames, and an absence of change for one or more frames in that order is judged to be the boundary of peak 1. By modifying the FF circuit and logic gates of FIG. 5, it is also possible to make the same judgment when an absence of change lasts for Tf or more consecutive frames, a presence of change for Tw or more consecutive frames and an absence of change for Ta or more consecutive frames in that order.

Because the decoder 43 has the same construction as that of the encoder 41, the encoder 41 may be constructed so as to act as both encoder and decoder, in which case the decoder 43 is unnecessary.

Figure 7:
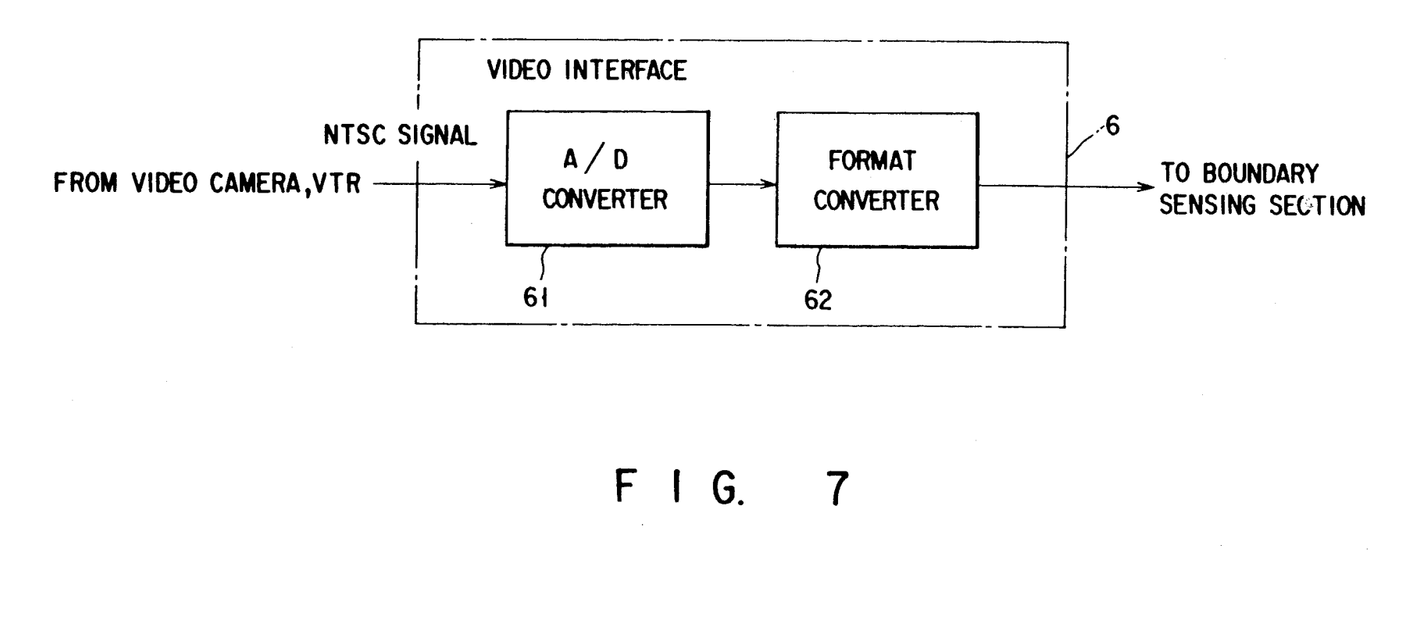
FIG. 7 is a block diagram showing the arrangement of the video interface of FIG. 1.

The video interface 6, as shown in FIG. 7, is composed of an A/D converter 61 and a format converter 62. The A/D converter 61 converts an NTSC signal from the video camera 7, VCR 8, or the like into a digitized signal. The format converter 62 converts the digitized NTSC signal from the A/D converter 61 into the format shown in FIG. 2.

The input signal may be of another type such as the high definition television type instead of the NTSC type. In this case, the format should be converted so as to be compatible with the resolution of the type used. Alternatively, the input signal may be converted into the format of the present embodiment beforehand at another system and supplied via a network or in the form of FD (floppy disk).

Now, the operation of such a configuration will be explained. When data entry from the video camera 7 or the video cassette in the VCR 8 into the magnetic disk 5 is specified from the mouse 10 or keyboard, frames of moving pictures will be supplied from the video camera 7 or VCR 8, via the video interface 6 and bus 9, to the boundary sensing section 4. The boundary sensing section 4 encodes the received moving pictures and at the same time, senses the cut boundaries.

Figures 10, 11:
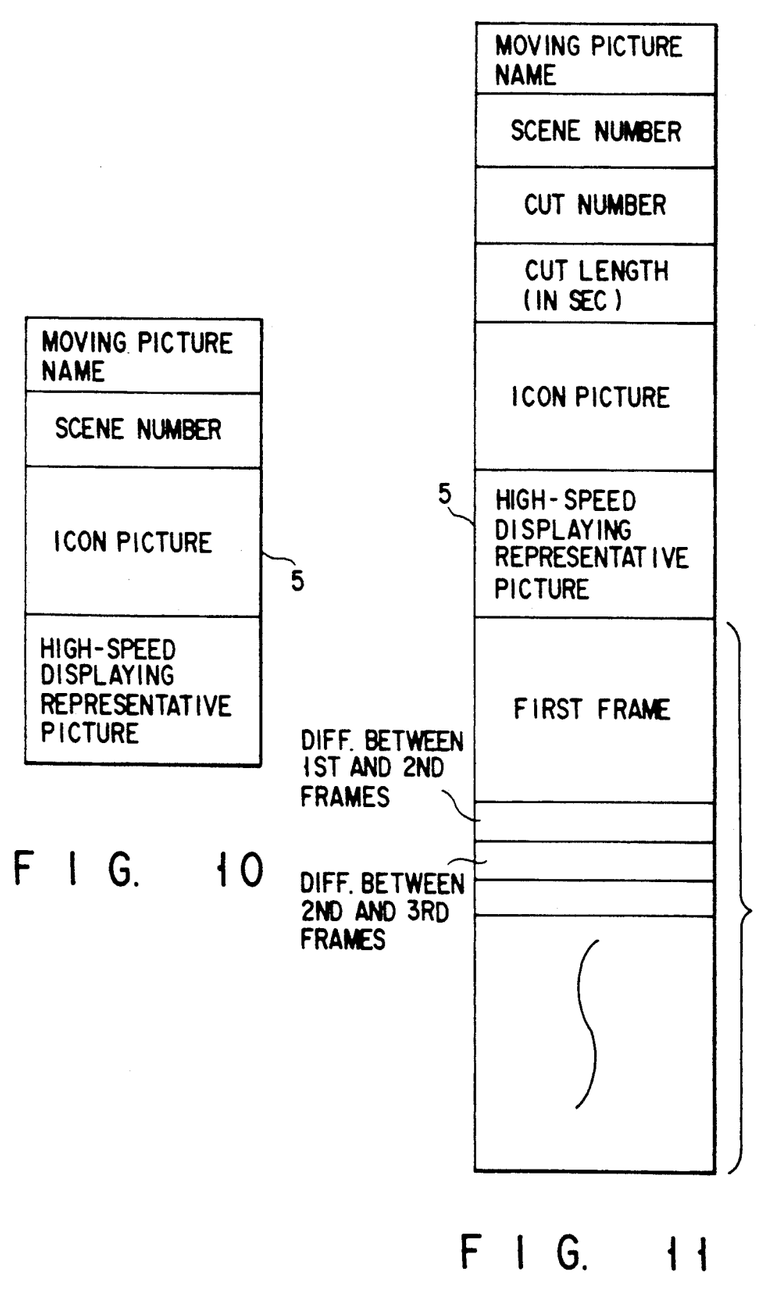
FIG. 10 depicts the contents of a scene file to be stored in the magnetic disk of FIG. 1.
FIG. 11 illustrates the contents of a cut file to be stored in the magnetic disk of FIG. 1.

After this processing, a cut consisting of a plurality of frames is stored as a cut file into the magnetic disk 5 in the magnetic disk device 11. In this case, as shown in FIG. 11, what is stored as a cut file in the magnetic disk 5 includes the name of a moving picture, scene number, cut number, cut length (in seconds), icon picture, decoded high-speed displaying representative picture, and decoded moving-picture information consisting of a cut's worth of frames, with the cut number assigned serially in the cutting order.

For an icon picture, a frame selected as a representative from the cut's worth of frames is reduced to the icon size and is decoded and stored as a picture.

Since it is no easy matter to check the contents of each cut for a representative frame, such a frame may be selected in such a previously determined manner that a frame located a specified number of frames after the first frame or a frame positioned in the center of the series of frames is chosen. Because there is no big difference between the frames within the same cut, even such a simple selection will provide a good result.

Since important information often appears in the center of a frame, trimming may center around the middle of the frame, followed by the reduction to the icon size.

For a high-speed displaying picture (a representative picture), like an icon picture, a frame selected as a representative from the cut's worth of frames is decoded and stored. The picture may be previously reduced to the high-speed displaying window size.

In the mode to display an entire moving picture or scene, the picture appears in the high-speed displaying window as representative of that cut.

It takes time to take out a particular frame from an encoded moving picture because this process requires the decoding of the frames from the beginning. However, as with the present embodiment, storage of previously decoded high-speed displaying pictures minimizes the readout time.

A scene is stored as a scene file into the magnetic disk 5 in the magnetic disk device 11. In this case, as shown in FIG. 10, what is stored as a scene file in the magnetic disk 5 includes the name of a moving picture, scene number, icon picture, and high-speed displaying picture. This file structure allows a high-speed display of scenes only.

An icon picture is such that a scene-representative picture is reduced to the icon size, and a high-speed displaying picture is such that a scene-representative picture is reduced to the high-speed displaying window size. The icon pictures and high-speed displaying pictures are decoded at the decoder 43 before storage.

The operator specifies the reading of a picture stored in the magnetic disk 5 from the mouse 10 or keyboard. Then, the CPU 1 sequentially reads out only the first frame of each cut under a corresponding moving picture name, and displays them on the CRT display device 2. Watching what is displayed on the screen, the operator checks to see if the cuts are partitioned properly, and, if necessary, specifies proper scene partitions (sets of successive cuts having unity in terms of meaning and time) from the mouse 10 or keyboard.

The CPU 1 assigns a scene number to each cut in the magnetic disk and replaces the cut numbers with the serial numbers of scenes. When it is found that the cuts are partitioned improperly, then the CPU 1 will store again the preceding and following cuts as a single cut into the magnetic disk 5.

Figure 8:
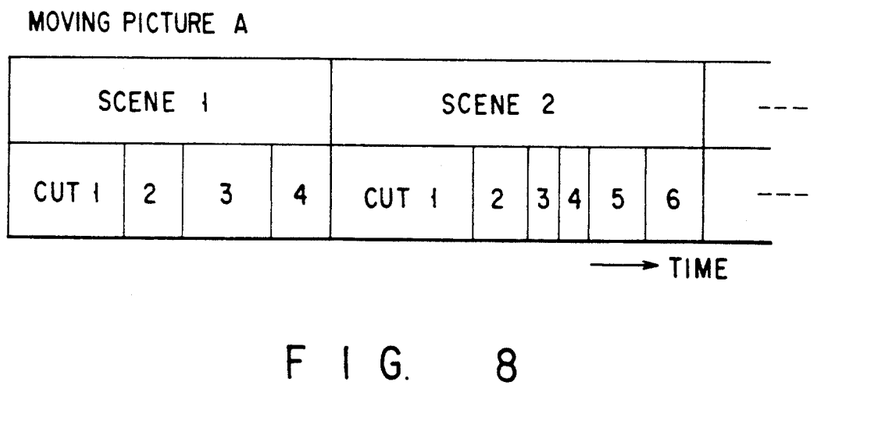
FIG. 8 illustrates how a moving picture is formed as time passes.
Figure 9:
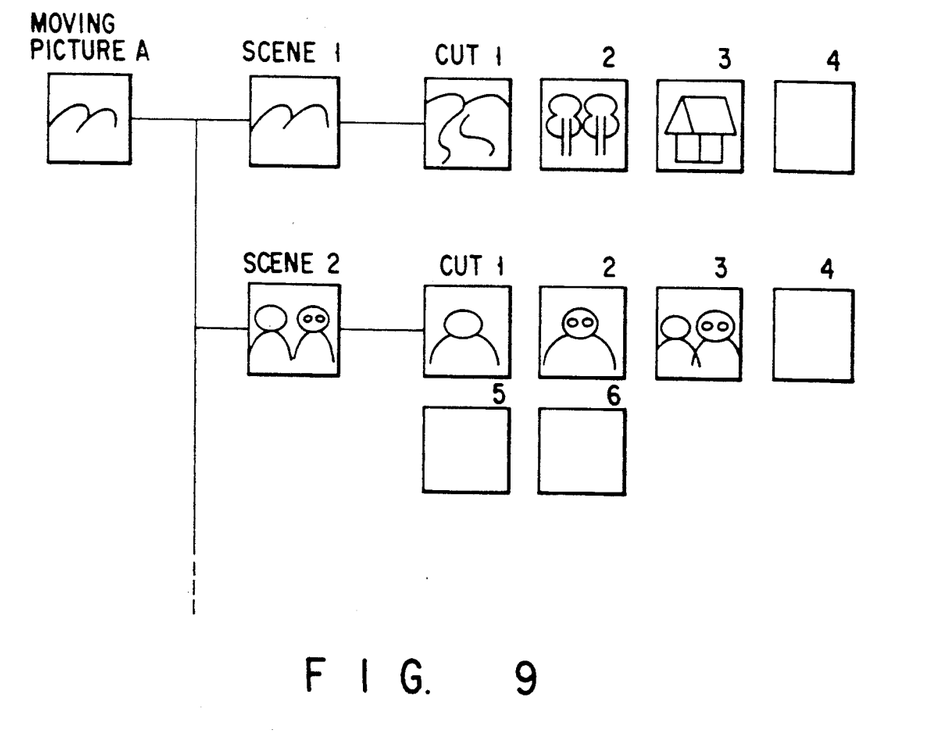
FIG. 9 shows a tree structure in which scenes and cuts are organized into a moving picture.

In this way, scenes and cuts for a series of moving pictures are organized on the magnetic disk, as shown in FIGS. 8 and 9. That is, they are store in a tree structure (or a hierarchy structure) where a plurality of scenes, each composed of a plurality of cuts, form a series of moving pictures.

Figure 12:
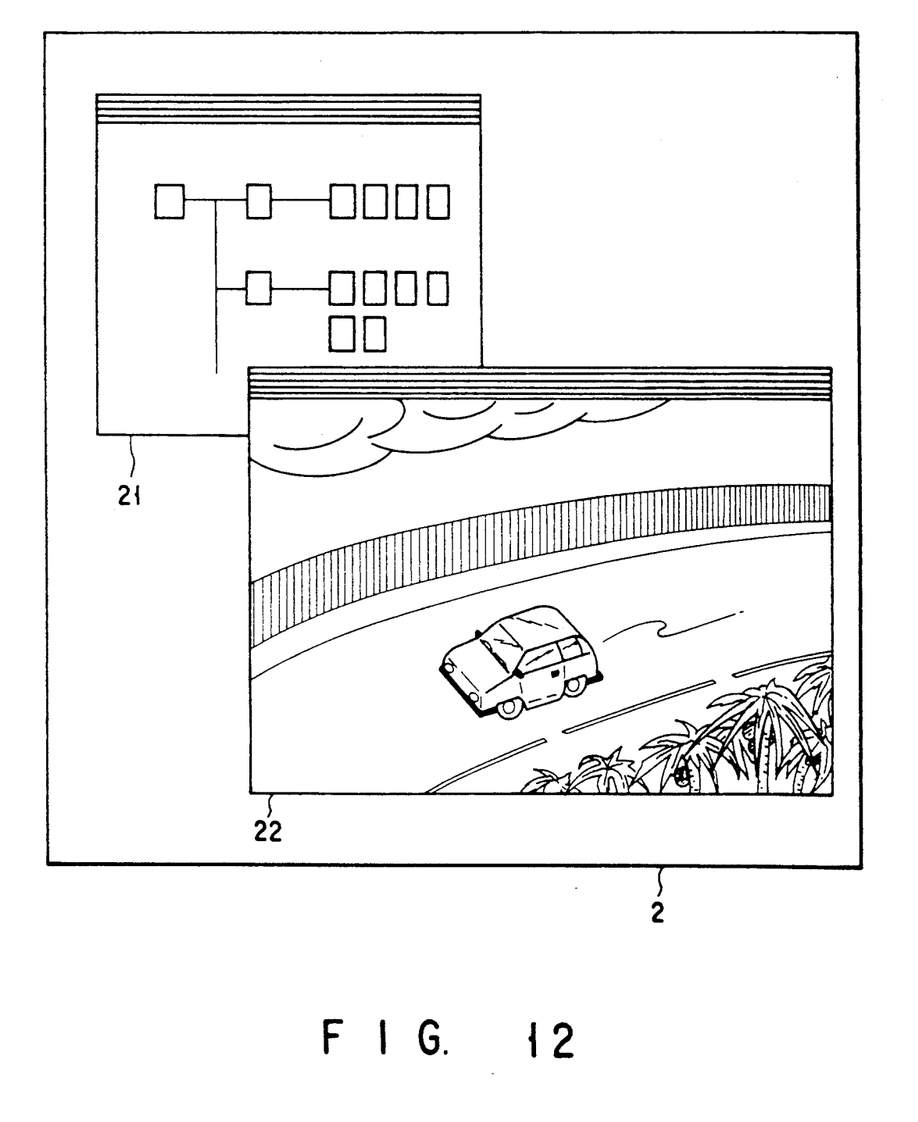
FIG. 12 is a view for pictures displayed on the CRT display in a moving picture managing device according to the present invention.

When the operator specifies the editing of moving pictures or another job along with the name of moving picture, then a picture showing a tree structure (a hierarchy structure) corresponding to the moving picture name will be read out of the magnetic disk 5, and displayed in the window 21 on the CRT display device 2, as showing in FIG. 12. Displayed in this window 21 is a structure in which a moving picture is divided and sorted into scenes and cuts, each indicated by a particular icon representative of the individual scenes and cuts.

When the operator specifies the reproduction of a particular icon from the mouse 10 or keyboard, another window 22 will be opened and the scene or cut indicated by the icon will be read out of the magnetic disk 5 and displayed in the window 22.

Figure 13:
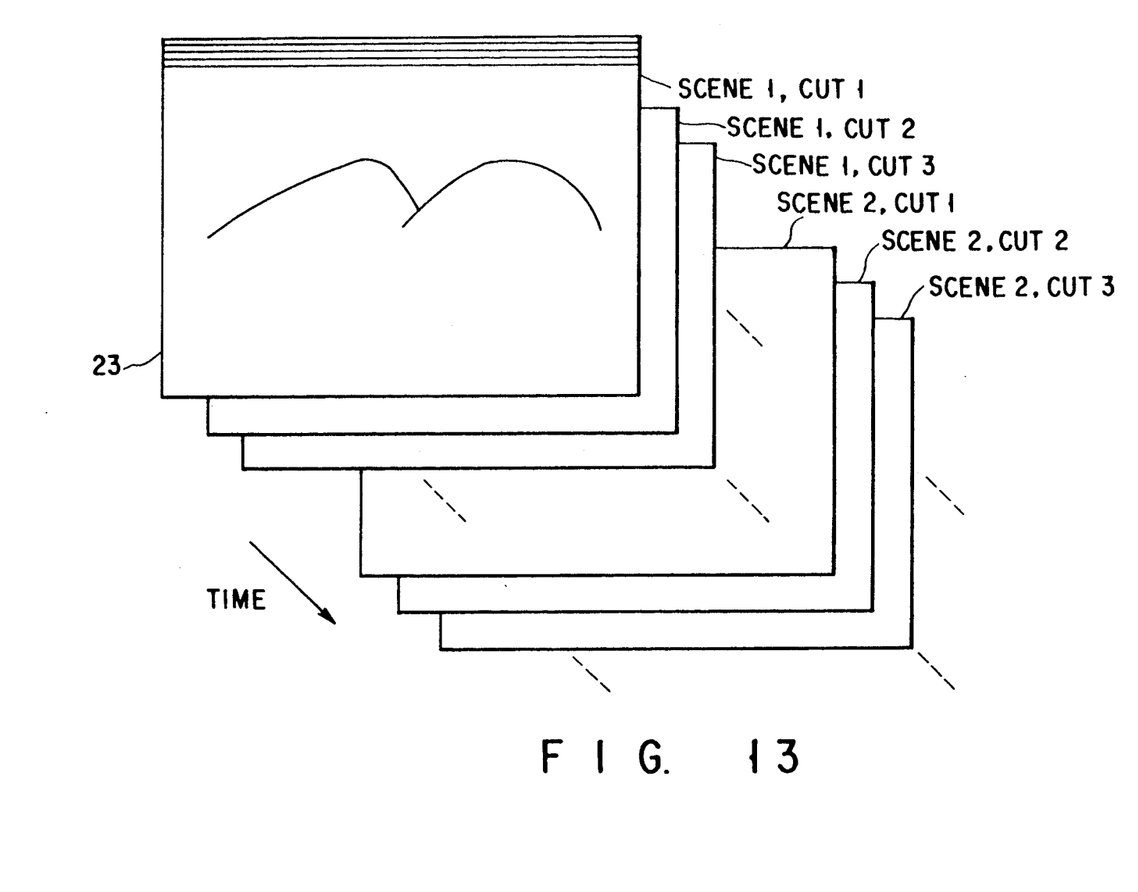
FIG. 13 is a view for pictures displayed at a high speed on the CRT display in a moving picture managing device according to the present invention.

When the operator specifies a high-speed reproduction of moving pictures or scenes from the mouse 10 or keyboard, high-speed displaying pictures for a cut ranking below the moving picture or scene will be read out of the magnetic disk 5 one after another and be displayed in the high-speed displaying window 23 on the CRT display device 2, as shown in FIG. 13. In this way, the operator can understand the contents of the moving picture or scene easily and quickly.

As noted above, the cut boundaries of the input moving picture are sensed according to the amount of change between frames. Based on these results, the picture is segmented into single-cut files, each consisting of a plurality of frames. These segmented single-cut files and high-speed displaying pictures are stored in the magnetic disk. At a later time, a picture for each single-cut file stored is read out of the magnetic disk and displayed While watching the displayed picture, the operator specifies scene partitions, each scene consisting of a plurality of cuts, from the mouse or keyboard. According to this specification, the moving picture is stored in a hierarchy structure of scenes and cuts in the magnetic disk. When a high-speed output of moving pictures is specified, the high-speed displaying pictures for the individual cuts will be read out of the magnetic disk and displayed.

In this way, it is possible to manage moving pictures by storing them in a hierarchy structure of scenes and cuts, easily retrieve the necessary scenes and cuts, allow an easy editing by scene or cut, and even provide automatic segmentation by cut, all of which help alleviates the user's loads.

Additionally, a high-speed display of the representatives of moving pictures or scenes allows the operator to understand the contents of the moving picture or scene easily and quickly, which also helps him have a good grasp of the entire structure of moving pictures and their relationship.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A moving picture managing device comprising:
   input means for inputting information according to a moving picture which has a format formed by a plurality of blocks;
   sensing means for, based on the difference between the number of blocks in encoding the moving picture within a frame and the number of blocks in an adjacent frame, sensing a boundary between a cut of the input moving picture and another cut, each cut consisting of a plurality of frames;
   storing means for storing moving picture information corresponding to said moving picture supplied in units of one cut according to the boundary sensed by said sensing means, and high-speed displaying pictures obtained in such a manner that a particular frame is selected as a representative picture from the frames constituting a cut, each selected frame representing at least each of said cuts;
   output means connected to said storing means for outputting in units of one cut the decoded moving picture read from said storing means;
   first specifying means for specifying a partition between a scene and another scene, each scene consisting of a plurality of cuts of the output moving picture from said output means;
   first processing means for, based on the specification by said first specifying means, causing said storing means to store a moving picture arranged in a tree structure of a plurality of scenes and cuts, each scene being coupled to a plurality of cuts belonging to the lower plane;
   second specifying means for specifying the browsing and output of said high-speed displaying pictures stored in said storing means; and
   means for, based on the specification by said second specifying means, causing said output means to perform the output of the high-speed displaying pictures browsed from said storing means.

2. A moving picture managing device according to claim 1, wherein said storing means stores a cut composed of a plurality of frames as a cut file, the cut file containing at least one of the name of a moving picture, scene number, cut number, cut length (in seconds), icon picture, decoded high-speed displaying picture, and encoded moving picture information composed of a cut's worth of frames.

3. A moving picture managing device according to claim 2, wherein said icon picture is a picture that is obtained by selecting a frame representative of a cut from a plurality of frames constituting the cut, reducing the scene-partitioning picture to the icon size, and decoding the reduced picture.

4. A moving picture managing device according to claim 1, wherein said high-speed displaying picture is a picture that is obtained by selecting a frame representative of a cut from a plurality of frames constituting the cut, reducing the scene-partitioning picture to the high-speed displaying window size, and decoding the reduced picture.

5. A moving picture managing device according to claim 1, wherein said storing means comprises a first storing means for storing said encoded moving picture information and a second storing means for storing said high-speed displaying pictures as a representative picture of each cut.

6. A moving picture managing device according to claim 1, wherein said sensing means determines that the boundary is sensed when for one side of adjacent frames consists of consecutive frames each of which has the number of encoded blocks less than a specified value and larger than the threshold value.

7. A moving picture managing device according to claim 1, wherein said sensing means contains encoding means for receiving and encoding a moving picture and a boundary sensor coupled to said encoding means, which, receiving either an intraframe flag or an interframe flag from said encoding means, supplies a boundary sense flag depending on the presence or absence of a flag indicating the threshold value is exceeded.

8. A moving picture managing apparatus, comprising:
   means for generating information in accordance with a moving picture;
   variation calculating means for providing variation of the information generated by the generating means;
   means for comparing the variation provided by the variation calculating means with a predetermined threshold;
   means for detecting a boundary between the information of first time and second time;
   means for selecting the information based on the boundary detected by the detecting means;
   means for storing the information selected by the selecting means; and
   means for outputting the information stored by the storing means to browse information.

9. The apparatus of claim 8, wherein the moving picture comprises a plurality of scenes, each scene including a plurality of cuts, and each cut including a plurality of frames.

10. The apparatus of claim 9, wherein the detecting means comprises:
    means for dividing the information into a plurality of blocks within a frame;
    first means for coding the information based on the relationship of the information of a frame and an adjacent frame in accordance with a first coding method;
    second means for coding the information in the unit of block within a frame in accordance with a second coding method;
    means for selecting one of the first and second means based on the variation of information between a frame and adjacent frame;
    means for counting the number of blocks coded by the second means; and
    third means for detecting a boundary between a cut and another cut, based on the difference between the number of blocks counted by the counting means.

11. A moving picture managing apparatus for storing information in accordance with moving picture which is in tree structure by a plurality of scenes, each scene including a plurality of cuts, each cut including a plurality of frames, the apparatus comprising:

means for sequentially generating information in accordance with moving picture in unit of the frame;

detecting means for detecting a boundary between the information of a frame and the information of an adjacent frame;

selecting means for selecting the information based on the boundary detected by the detecting means;

means for storing the information selected by the selecting means; and means for outputting the information to browse the information in accordance with the moving picture.

12. A method of managing a moving picture comprising steps of:

inputting information according to a moving picture which has a format formed by a plurality of blocks;

based on the difference between the number of blocks in encoding the moving picture within a frame and the number of blocks in an adjacent frame, sensing a boundary between a cut of the input moving picture and another cut, each cut consisting of a plurality of frames;

storing encoded moving picture information corresponding to said moving picture supplied in units of one cut according to the boundaries sensed at said sensing step, and the decoded high-speed displaying pictures obtained in such a manner that a particular frame is selected as a representative picture from the frames constituting a cut, each selected frame representing at least each of said cuts in a storing means;

outputting in units of one cut the decoded moving picture read by said storing step;

first specifying a partition between a scene and another scene, each scene consisting of a plurality of cuts of the output moving picture;

based on the specification by said first specifying step, storing a moving picture arranged in a tree structure of a plurality of scenes and cuts, each scene being coupled to a plurality of cuts belonging to the lower plane;

second specifying the browsing and output of said high-speed displaying pictures stored in said storing means; and based on the specification by said second specifying step, performing the output of the high-speed displaying pictures browsed from said storing means.

13. A method of managing a moving picture according to claim 12, wherein said sensing step determines that the boundary is sensed when one side of adjacent frames consists of consecutive frames each of which has the number of encoded blocks less than a specified value and larger than the threshold value.

14. A method of managing a moving picture according to claim 12, wherein said sensing step contains encoding step for receiving and encoding a moving picture and by receiving either an intraframe flag or an interframe flag, for outputting boundary sense flag depending on the presence or absence of a flag indicating the threshold value is exceeded.

* * * * *